United States Patent [19]
Mumper

[11] Patent Number: 5,567,113
[45] Date of Patent: Oct. 22, 1996

[54] APPARATUS AND METHOD FOR PALLETIZING WORK PIECES

[76] Inventor: Richard G. Mumper, W331 N6200 Hwy. C, Nashotah, Wis. 53058

[21] Appl. No.: 509,593

[22] Filed: Jul. 31, 1995

[51] Int. Cl.⁶ .......................... B65G 57/03; B65G 57/22
[52] U.S. Cl. ...................... 414/791.6; 414/794.3
[58] Field of Search ........................ 414/799, 788.9, 414/791.6, 794.3

[56] References Cited

U.S. PATENT DOCUMENTS

| | | | |
|---|---|---|---|
| 2,768,756 | 10/1956 | Horman | 414/794.3 |
| 3,833,132 | 9/1974 | Alduk | 414/794.3 |
| 4,354,786 | 10/1982 | Spitler | 414/799 |
| 4,708,564 | 11/1987 | Mylrea et al. | 414/794.3 |
| 4,815,924 | 3/1989 | Jaatinen | 414/794.3 |
| 5,158,424 | 10/1992 | Mojden et al. | 414/799 |
| 5,437,533 | 8/1995 | Vandermeer et al. | 414/791.6 |

*Primary Examiner*—Karen B. Merritt
*Assistant Examiner*—Douglas Hess
*Attorney, Agent, or Firm*—Wheeler Kromholz & Manion

[57] ABSTRACT

An apparatus and method for palletizing work pieces or stacks of work pieces from a storage table onto a pallet. A sweep plate lowers at the edge of the storage table and sweeps the work pieces onto a movable load table. The load table moves over the pallet and a wipe plates lowers such that when the load table is retracted, the work pieces will be deposited onto the pallet. A hydraulic lift table is also provided for supporting the pallet and automatically lowering the pallet to accommodate the layer of work pieces.

11 Claims, 2 Drawing Sheets

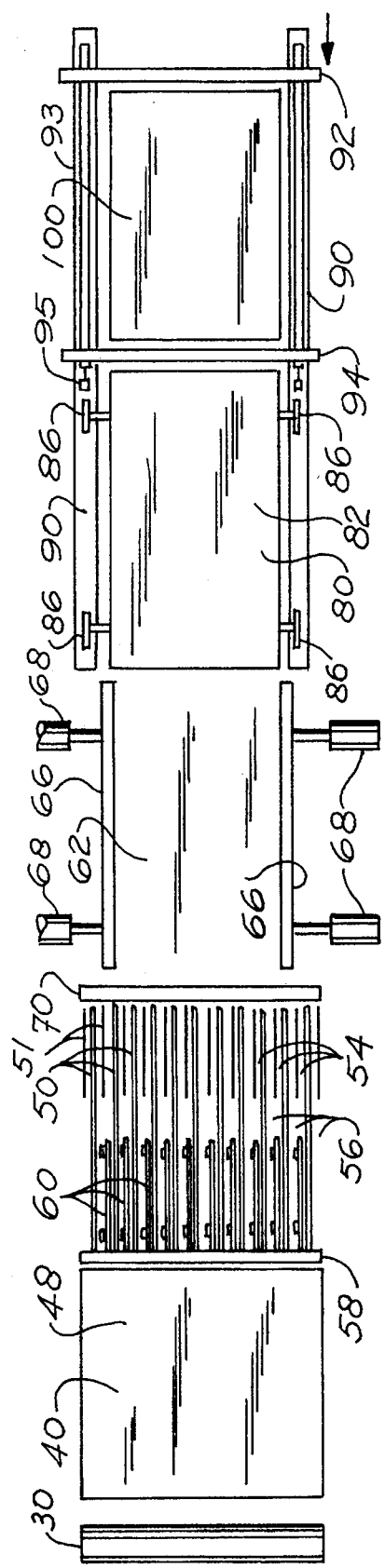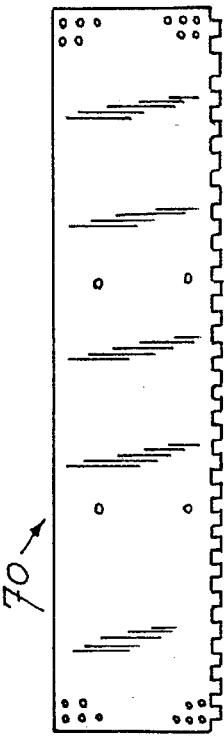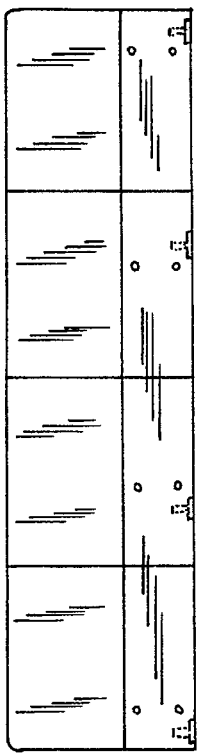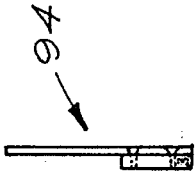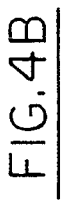

APPARATUS AND METHOD FOR PALLETIZING WORK PIECES

BACKGROUND OF THE INVENTION

In the process of manufacturing materials like cardboard book backings for book covers and/or packaging, such as boxes, cartons, and dividers., a slitter is often employed to cut the material, typically cardboard, to the required size. Once the material has been cut or "blanked", it must be either moved directly from the slitter to a subsequent machine or each blank must be palletized for subsequent delivery to another machine.

My invention fully automates the palletizing process of packaging blanks. While stacking the blanks and arranging the stacks in groups is known in the art, it has always been necessary to employ a person to move the stacks from the storage table onto a pallet. My invention eliminates the need for this person during the palletizing process.

A sheet of stock material is cut to a predetermined size or blank by a slitter or slitting machine. The blank is ejected from the slitter onto a fiat belt. The blank runs between an upper roller and the belt onto a second moving means which comprises a series of parallel, equally spaced V-belts. A plurality of stop bars extend upward between the openings or gaps between the V-belts. When each successive blank passes under the roller at the end of the fiat belt and arrives onto the second moving means, it is directed underneath the previous blank. The rear edges of the blanks, which continue to move upward in a stack as more blanks arrive, are kept in alignment by an alignment plate. The alignment plate is positioned a distance equal to the width of each blank with respect to the stop bars.

When a predetermined number of blanks have been stacked between the alignment plate and stop bars, a plurality of lifting forks emerge from between the openings between the V-belts and lift the stack of blanks above and over the plurality of stop bars. The lifting forks retract under the V-belts on the opposite side of the stop bars thereby placing the stack of work pieces back onto equally spaced metal bars.

The stack is transferred by the back of the forks each cycle from the metal bars rearward onto a storage table and unloading table. In the prior art, the stacks of blanks were manually removed from the storage table and manually placed onto a pallet.

My invention fully automates this manual operation. It is an object of my invention to automatically move at least one stack of work pieces or blanks from the storage table onto a pallet. It is a further object to provide a system for moving a plurality of adjacent stacked blanks from the storage table onto a pallet. It is yet a further object to provide the system with a means of placing a plurality of adjacent stacks onto a pallet, one set of adjacent stacks on top of the next. It is a further object to provide a system capable of filling an entire pallet automatically before any manual work is required. It is a further object of my invention to provide a system of palletizing where the slitter does not have to stop. These and other advantages of my invention will become evident in the following descriptions. I know of no prior art which teaches or discloses my invention.

SUMMARY OF THE INVENTION

My invention comprises a palletizer for palletizing adjacent stacks of work pieces or cardboard blanks. While it is designed for use with a piece of cardboard, it is to be understood that any sufficiently fiat and planer work piece, having the necessary characteristics of the application for which cardboard is potentially suitable, could be palletized utilizing my invention.

Stacks of work pieces arrive onto a storage table in a known manner. When the desired number of stacks have been placed adjacent to each other upon the storage table, a sweep plate, attached to a frame, descends upon the front or leading edge of the storage table. The sweep plate lowers until its bottom edge is in near contact with the top surface of the storage table. The sweep plate next moves in a horizontal direction whereby it pushes the stacks of work pieces from the storage table onto an adjacent load table. The top surface of the load table is at the same height as the surface of the storage table so that the work pieces are simply pushed from the storage table onto the load table. The sweep plate generally moves horizontally from the leading edge of the storage table, across the top surface of the table, and to the far edge of the storage table. The sweep plate is then lifted upward so that its lower edge is higher than the stacks of work pieces and is then moved horizontally in the opposite direction to its original position above the leading edge of the storage table. The sweep plate is driven within a frame and is powered by a moving mechanism such as a pneumatic cylinder or hydraulic cylinder or the like.

The load table comprises a thin plate having a tapered trailing edge. A pair of side plates are positioned along the side edges of the load table for maintaining positive alignment of the work piece stacks. The side plates are mounted on hydraulic cylinders which simultaneously move toward one another a predetermined distance to maintain the positive alignment. In addition, a plurality of wheels are attached to the bottom side of the load table. The wheels fit within sets of tracks that extend from the storage table toward the end of my invention.

When the required number of stacks have been moved on to the load table by the sweep plate, the load table is moved by a motor along the track and into a position directly above a pallet. The distance between the bottom side of the load table and the top surface of the pallet is minimal. When fully moved, the leading edge and leading stack of work pieces contact a stationary back stop attached to the end of the track. Once in this position, a wipe plate is lowered from above in a manner similar to the initial movement of the sweep plate. The wipe plate stops when its bottom edge is in contact with the top surface of the load table. When the wipe plate is fully lowered, the load table retracts or moves in the opposite direction back toward the storage table again by means of the motor. Due to the blocking position of the wipe plate, the stacks of work pieces cannot also retract. As the load table is pulled out from beneath each stack, each stack is deposited onto the pallet or onto the previous stack dispensed onto the pallet. The leading edge of the load table is tapered such that the stacks drop only a minimal distance as they are deposited onto the pallet.

The pallet is located upon a hydraulic lift table capable of raising and lowering the pallet. After each set of adjacently stacked work piece stacks are dispensed onto the pallet, the hydraulic lift table lowers a predetermined distance so that when the load table brings over the next set of work piece stacks, the load table does not push the previous set off of the pallet. Similarly, the pallet is lowered only the required amount so that the next set of stacks are not dropped more than a minimal distance,onto the pallet or previous set. An electric eye is coupled to the control mechanism of the hydraulic lift. When the electric eye senses that one or more stacks have been deposited on the pallet, the electric eye sends a signal to the control mechanism which in turn allows the hydraulic lift to lower a predetermined amount.

Alternatively, my invention could be described as a method for palletizing a stack of work pieces, the stack having a leading side and a trailing side, the method comprising moving at least one stack of work pieces from a storage table onto a load table, moving the load table over a pallet, lowering a wipe plate against the trailing edge of the stack, and retracting the load table whereby the stack is deposited onto the pallet.

DESCRIPTION OF THE DRAWINGS

FIG. 2 is a top plan view of my palletizer.

FIG. 3 is an elevational side view of the unloading table.

FIG. 4A is an elevational front view of the wipe plate.

FIG. 4B is an elevational side view of the wipe plate.

FIG. 5 is an elevational front view of the sweep plate taken along line 5—5 of FIG. 1.

DETAILED DESCRIPTION

Figure 1:
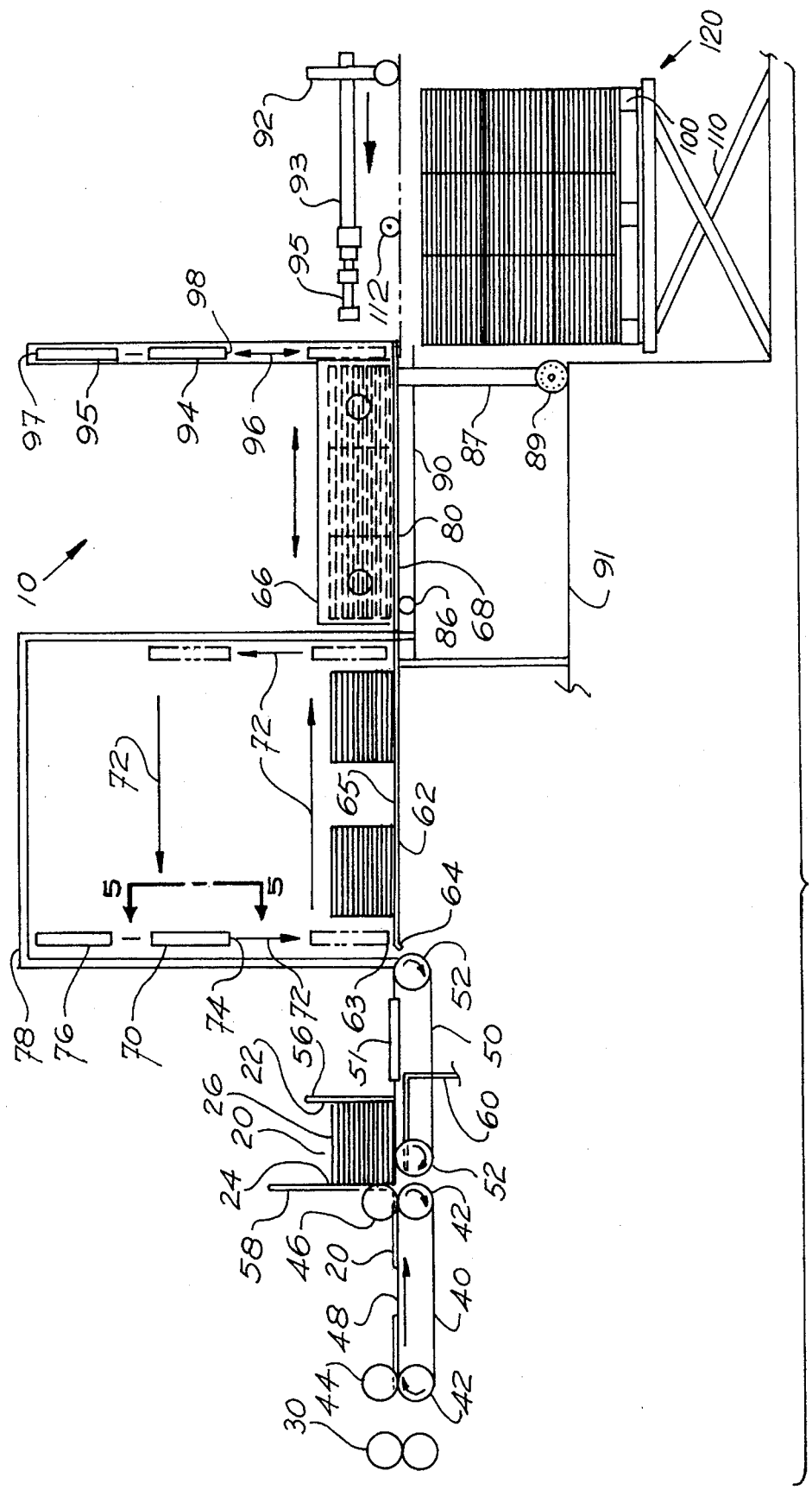
FIG. 1 is an elevational side view of my palletizer.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The invention shown at 10 in the drawings comprises a palletizer for palletizing work pieces 20. In the preferred embodiment, the palletizer 10 is coupled to a slitting machine or slitter 30 located adjacent to a fiat belt 40 driven by belt rollers 42 and having a pair of top rollers 44 and 46.

As shown in FIG. 1, work pieces 20 are cut by slitter 30 from a sheet of stock material. In the preferred embodiment, work pieces 20 comprise cardboard blanks to be used in the manufacture of book backs or sides for hard cover books although the cardboard blanks could have other uses like the manufacturer of boxes, cartons, and dividers. Therefore it is to be understood that any sufficiently fiat and planer work pieces 20 could be used with my invention 10.

After being discharged from slitter 30, work pieces 20 pass between upper roller 44 and belt 40. Belt 40 carries each work piece 20 along its top surface 48 and to its opposite end where each work piece 20 passes between upper roller 46 and belt 40.

A plurality of V-belts 50 which ride in driven sheaves 52 are located adjacent roller 46. A plurality of stop bars 56 project between the gaps or openings 54 between V-belts 50. As each work piece 20 passes between roller 46 and belt 40, it is dispensed onto the plurality of V-belts 50. The work piece 20 travels on the plurality of V-belts 50 until leading edge 22 comes into contact with the plurality of stop bars 56. As each successive work piece 20 is dispensed onto the plurality of V-belts 50, it passes beneath the previously dispensed work piece 20. Thus, as shown in FIG. 1, the work pieces 20 are stacked with each new work piece 20 being added to the bottom of the stack 26.

An alignment plate 58 is provided to maintain the trailing edges 24 of the work pieces in alignment. The distance between the alignment plate 58 and the plurality of stop bars 56 is substantially equal to the width of each work piece 20.

Once a predetermined number of work pieces 20 have been stacked between alignment plate 58 and stop bars 56, a plurality of lifting forks 60 emerge from between gaps 54 and lift stack 26 up and over the plurality of stop bars 56 and set stack 26 onto a set of metal bars 51 that support the "V" belt assemblies on the opposite side of stop bars 56. After lifting forks 60 pass beneath the V-belts 50, they move forward and come back into their starting position under the new stack 26 of work pieces 20 being formed.

At each cycle of the forks 60, the preceding stack 26 is pushed rearward by the vertical part of the fork 60. Storage table 62 has a downwardly curving lip 64 as shown in FIG. 1, to facilitate the movement of stacks 26 from V-belts 50 onto storage table 62.

A pair of side plates 66 are provided for keeping stacks 26 in proper alignment. The side plates 66 can be mounted along the sides of the storage table 62 as shown in FIG. 2 or along the side edges of the load table 80 as shown in FIG. 1 and described infra. Each side plate 66 has a pair of hydraulic cylinders 68 attached. The hydraulic cylinders 68 simultaneously extend a predetermined amount to maintain the side edges of the stack work pieces 20 in a uniform manner.

A sweep plate 70, shown in FIGS. 1, 2, and 5, is provided for moving the plurality of stacks 26 from storage table 62 onto load table 80. FIG. 1 includes the path of motion of swipe plate 70 shown at 72. Sweep plate 70, powered by a plurality of air cylinders 76 which extend between sweep plate 70 and frame number 78, lowers into position at the leading edge 63 of storage table 62. When the required number of stacks 26 are obtained on storage table 62, sweep plate 70 lowers until its lower edge 74 nearly contacts the top surface 65 of storage table 62. Sweep plate 70 then moves in a substantially horizontal direction thereby pushing or sweeping the adjacent stacks of work pieces 20 from storage table 62 onto load table 80. Sweep plate 70 then raises so that its lower edge 74 is higher than the stacks 26 and moves in the opposite horizontal direction back to its initial location.

Load table 80 is shown in FIGS. 1, 2, and 3. It comprises a substantially fiat, planer plate 82 which has a beveled trailing edge 84, two wheels 86, a pair of support legs 87, and a pair of "V" grooved casters 89. The wheels 86 ride in tracks 90 which extend from storage tables 62 toward the end of the palletizer 10. The pair of support legs 87 extend from the load table 80 to a second track 91. The "V" grooved casters 89 ride in the second track 91. The support legs 87, as well as the tracks 91, straddle the lift pit 120. The load table 80 is powered by a d.c. (direct current) motor which enables it to move back and forth on tracks 90 and 91.

After sweep plate 70 has pushed a plurality of work piece stacks 26 onto load table 80, load table 80 moves in tracks 90 and 91. Load table 80 travels in tracks 90 and 91 until the leading stack 26 of work pieces 20 are near to back stop 92. Back stop 92 is attached to rods 93 actuated by air cylinders 95 near the end of tracks 90. When the leading stack 26 comes near to back stop 92, load table 80 is directly over a pallet 100. When the adjacent stacks 26 are in this location, wipe plate 94 which is attached to frame member 95 and powered by pneumatic cylinder 97 lowers from a position above palletizer 10. The path of motion of wipe plate 94 is shown in FIG. 1 at 96. Wipe plate 94 is also shown in FIGS. 4A and 4B. Wipe plate 94 is lowered such that its lower edge 98 is touching top surface 82 of load table 80. Once wipe plate 94 has been fully lowered, load table 80 retracts to its original position. As the load table 80 retracts back stop 92 moves frontward to touch pile 26, the stacks 26 of work pieces 20 are deposited onto pallet 100 as lowered wipe plate 94 prevents the stacks 26 from retracting with load table 80. Thus, the stacks 26 are automatically deposited onto pallet 100. In addition, pallet 100 is located upon a lift mechanism 110. Lift mechanism 110 is typically operated by means of a hydraulic cylinder and pump in combination with a control mechanism. An electric eye 112 is provided and made integral to lift mechanism 110 for automatically lowering lift mechanism 110 after each set of adjacent stacks 26 are deposited onto pallet 100. When pallet 100 has been filled to capacity with stacks 26, the full pallet 100 is removed, the lift mechanism 110 is fully raised, and a new pallet is placed onto lift mechanism 110.

During the time that the load table 80 is depositing the stacks 26 on the pallet 100, the incoming blanks 20 are being stacked and moved to the rear where they accumulate on the storage table 62. This results in a continuously running system without a requirement to shut down the infeed slitter 30.

Alternatively, my invention 10 could be described as a method for palletizing work pieces 20, each work piece 20 having a trailing side 24, from a storage table 62 to a pallet 100, the method comprising swiping at least one work piece 20 from the storage table 62 onto a load table 80, moving the load table 80 over the pallet 100, lowering a wipe plate 94 against the trailing side 24 of the work piece 20, retracting the load table 80 whereby the work piece 20 is deposited on the pallet 100, and lowering the pallet 100 in preparation of a subsequent work piece 20.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for palletizing work pieces from a storage table to a pallet, the apparatus comprising:

a frame;

a track connected to the frame, the track extending from the storage table over the pallet;

a load table movably mounted on the track;

a sweep plate for pushing the work pieces from the storage table onto the load table, the sweep plate connected to a sweep plate moving mechanism, the sweep plate moving mechanism connected to the frame;

a wipe plate for retaining the work pieces above the pallet, the wipe plate connected to a wipe plate moving mechanism, the wipe plate moving mechanism connected to the frame;

a hydraulic lift for supporting and lowering the pallet, the hydraulic lift located below an edge portion of the track;

a back stop mounted to a pair of sliding rods, the sliding rods actuated by air cylinders.

2. The apparatus of claim 1 wherein the load table has a plurality of wheels rotatably attached, each wheel being engaged within the track.

3. The apparatus of claim 1 wherein the sweep plate moves in a substantially rectangular path of motion.

4. The apparatus of claim 1 wherein the sweep plate moving mechanism comprises at least one hydraulic cylinder.

5. The apparatus of claim 1 wherein the sweep plate moving mechanism comprises at least one pneumatic cylinder.

6. The apparatus of claim 1 wherein the wipe plate moving mechanism comprises at least one hydraulic cylinder.

7. The apparatus of claim 1 wherein the wipe plate moving mechanism comprises at least one pneumatic cylinder.

8. The apparatus of claim 1 wherein the hydraulic lift further includes a control mechanism and an electric eye, the electric eye being coupled to the control mechanism and the control mechanism being coupled to the hydraulic lift.

9. The apparatus of claim 1 further including a load table moving mechanism, the load table moving mechanism connected to the load table.

10. The apparatus of claim 9 wherein the load table moving mechanism comprises a motor.

11. An apparatus for continuously palletizing work pieces from a continuously operating work piece source to a pallet, the apparatus comprising:

a frame;

a storage table mounted to the frame;

a track connected to the frame, the track extending from the storage table over the pallet;

a load table movably mounted on the track;

a sweep plate for pushing the work pieces from the storage table onto the load table, the sweep plate connected to a sweep plate moving mechanism, the sweep plate moving mechanism connected to the frame;

a wipe plate for retaining the work pieces above the pallet, the wipe plate connected to a wipe plate moving mechanism, the wipe plate moving mechanism connected to the frame;

a hydraulic lift for supporting and lowering the pallet, the hydraulic lift located below an edge portion of the track;

a back stop mounted to a pair of sliding rods, the sliding rods actuated by air cylinders.

* * * * *